Aug. 8, 1961 J. F. NENZELL 2,995,057
SEAL FOR RIGID SEATING MEMBERS WHEREIN PROTRUDING PORTION
THEREOF IS RECEIVABLE INTO ADJACENT CHANNEL PORTION
Filed March 15, 1957 3 Sheets-Sheet 3
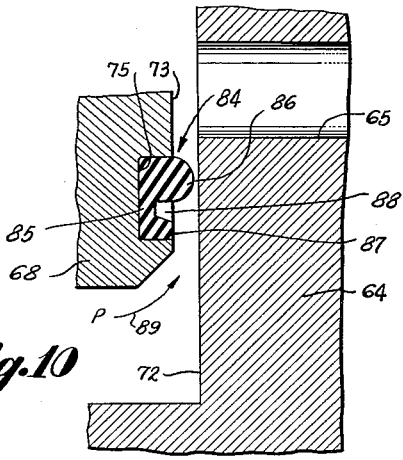
Fig. 10
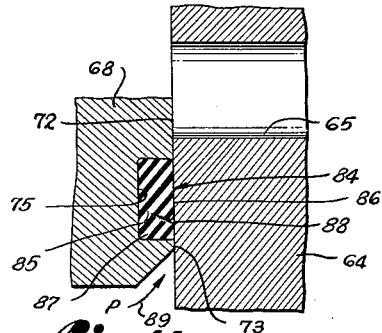
Fig. 11
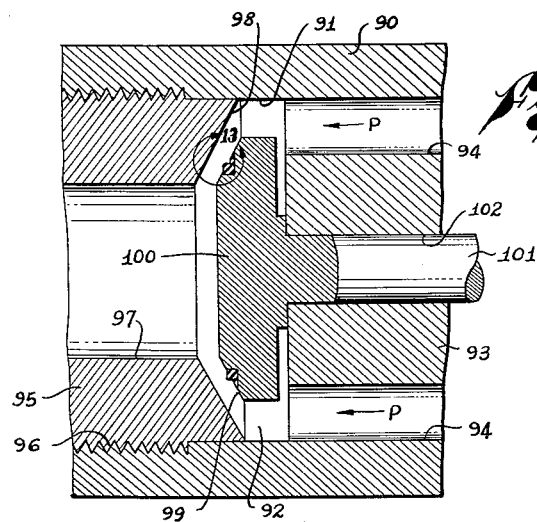
Fig. 12
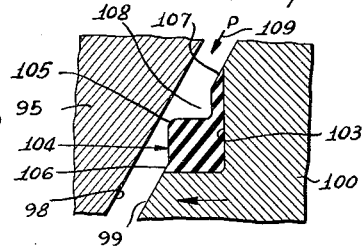
Fig. 13
Fig. 14
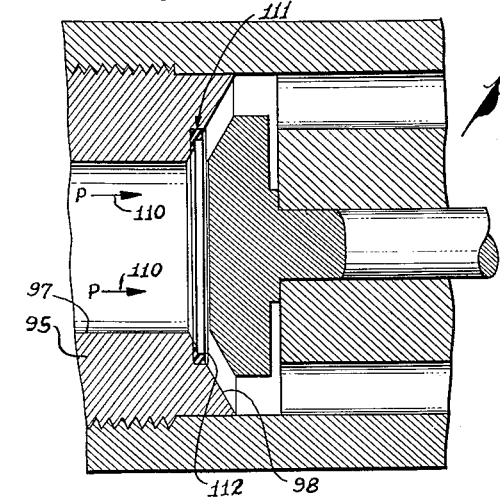
Fig. 15
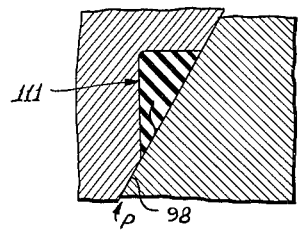
Fig. 16
INVENTOR.
JOSEPH F. NENZELL
BY Fulwider Mattingly & Huntley
Attorneys United States Patent Office 2,995,057
Patented Aug. 8, 1961

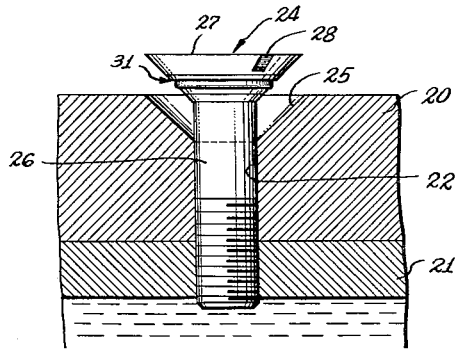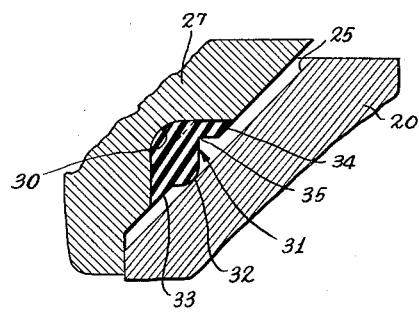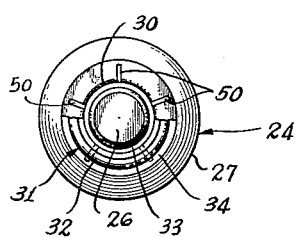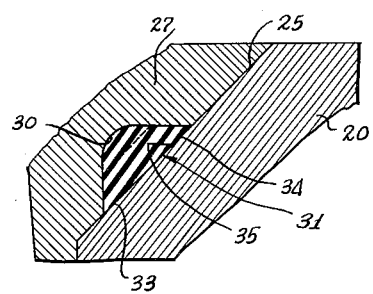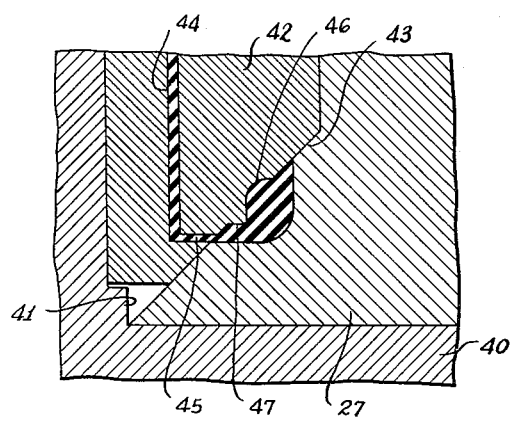

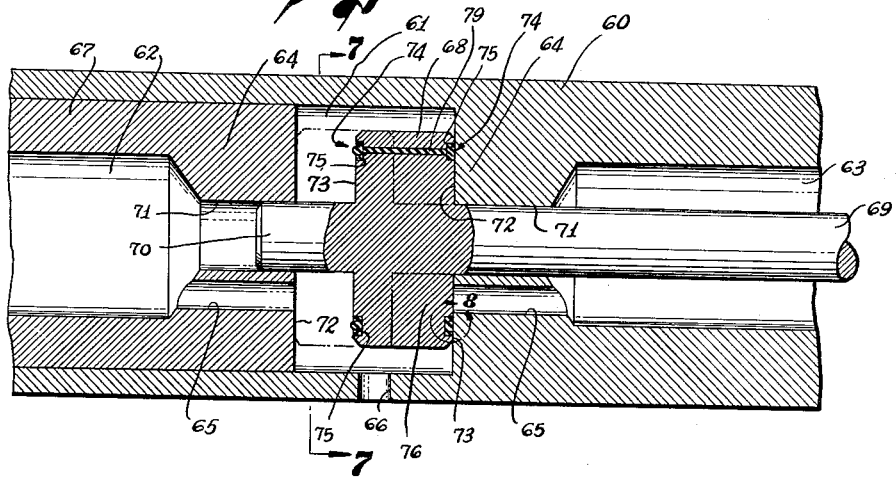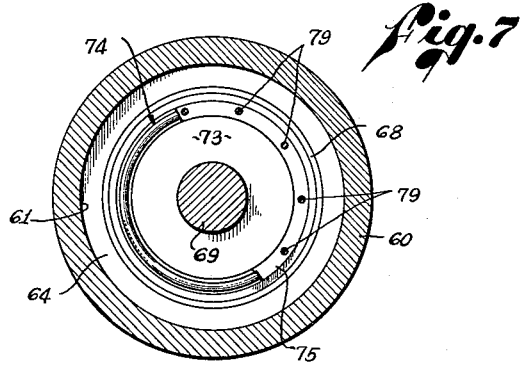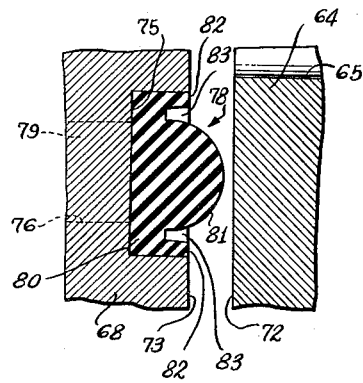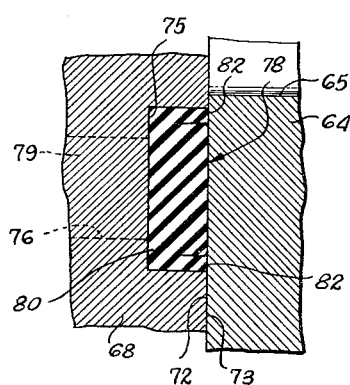
INVENTOR.
JOSEPH F. NENZELL

2,995,057
SEAL FOR RIGID SEATING MEMBERS WHEREIN PROTRUDING PORTION THEREOF IS RECEIVABLE INTO ADJACENT CHANNEL PORTION
Joseph F. Nenzell, Culver City, Calif., assignor to Parker-Hannifin Corporation, a corporation of Ohio
Filed Mar. 15, 1957, Ser. No. 646,381
8 Claims. (Cl. 85—9)

This invention relates generally to sealing means and more particularly to a deformable seal for use between rigid members which are adapted to seat together, either in a static secured position, or in a relatively movable relationship such as in a valve. This application is a continuation-in-part of my application Serial No. 401,819, filed January 4, 1954, for "Conical Headed Fastener Having Annular Sealing Means Retained Thereon," and my application Serial No. 401,996 filed January 4, 1954, for "Seal for Movable Closure Member" and both now abandoned.

All of the embodiments of the subject invention which are described herein are concerned with a sealing structure wherein a deformable packing element is positioned within a retaining groove formed in one rigid member, and projects therefrom for contact and sealing engagement against an opposed surface formed on a mating member. Such a packing element is typically formed of a solid resilient rubber-like material which, as can be understood, is incompressible to any substantial degree. As the rigid members are moved together into tight surface contact, the packing element is deformed and forced back into the retaining groove and at the same time bears firmly against all of the surrounding rigid surfaces to seal against fluid leakage. Certain requirements in such a device are critical to achieve good sealing. One of these, due to the incompressible nature of the material, is that the packing element have such volumetric relationship with the retaining groove that it can be deformed completely into the groove with no excess of material to extrude or be pinched off outside the groove. Another requirement is that the forces acting on the packing element to cause its deformation do not deform the element away from but into the groove. After the seal is in place, the effect of high fluid pressures must be considered, and if the pressure is sufficiently high to cause additional deformation, the shape of the packing element facing the fluid pressure should be such that further deformation will cause even tighter sealing contact with the opposed surface and not a movement away from said surface.

One embodiment of the invention that fulfills these requirements and is particularly advantageous in different installations is a seal in which the packing element has a raised projecting portion and a void channel open to the surface of the groove and adjacent one side of the raised portion. In a structure wherein the rigid mating members come together by movement which has a component of motion transversely or across the width of the retaining groove, the engagement and subsequent deformation of the packing element by the surface of the opposing member tends to move the raised portion towards the side and normally would ultimately move the raised portion out of the groove, as well as down into the groove. An example of such a structure is a conically headed fastener seating in a complemental opening in a body wall. By positioning the void channel on the side of the raised portion towards which the raised portion is deformed by the transverse component of force, any extrusion or pinching off of the packing element beyond the confines of the groove is prevented.

Another structure in which the aforesaid embodiment of the invention is particularly advantageous is in a high-pressure valve structure or the like, wherein there is fluid pressure of sufficient magnitude to deform the packing element beyond the deformation that occurs during the seating of the rigid members. Under these conditions, the void channel is placed on the side of the packing element which faces the fluid under pressure. Thus, as the fluid pressure acts on the packing element, it tends to push the raised portion out of the void channel and back into its undeformed shape. On the opposite side of the raised portion there is no void space, and the result is that the pressure of the fluid moves the element more tightly against the opposed surface and enhances the sealing effect.

With the foregoing in mind, it is a major object of this invention to provide a sealing structure which includes a deformable packing element having a raised portion and a void channel on one side of the raised portion and of sufficient volume to receive the raised portion therein.

Another object of the invention is to provide a sealing structure having a retaining groove and a packing element therein which is provided with a void channel and a raised portion so disposed that the raised portion is driven into the void channel by any transverse component of force acting on the packing element during its seating engagement.

A further object of the invention is to provide a sealing structure for use in high-pressure installations and having a packing element which is deformed into tighter sealing engagement with an opposed surface by the effect of the fluid acting against it.

It is also an object of the invention to provide sealing means for a flush headed fastener which makes positive sealing contact between the fastener head and the wall surface of the adjacent structure.

Another object of the invention is to provide sealing means for a flush headed fastener which does not interfere with the proper seating of the fastener and can be reused repeatedly.

It is also an object of the invention to provide sealing means including a rigid-walled retaining groove which cooperates with the adjacent wall structure to hold a packing member under resilient deformation.

A further object of the invention is to provide sealing means having a deformable packing member of controlled volume for proper volumetric relationship with the retaining groove.

It is also an object of the invention to provide fastener sealing means having a groove formed with holding ribs therein for engagement with a packing member to prevent relative rotation between the retaining body and the packing member.

It is also an object of this invention to provide a sealing construction for a valve structure or the like having a deformable packing element in combination with rigid stop surfaces for determining precise positioning of relatively movable members.

It is another object of the invention to provide a deformable packing element fitted within a retaining groove and formed with a portion projecting beyond said groove for sealing engagement with an opposed surface and adapted to be resiliently deformed entirely within said groove.

A further object of the invention is to provide a deformable packing element having a bottom portion filling the bottom of a retaining groove and an outer central portion projecting beyond the top of the groove and adapted to be deformed into said groove upon engagement with an opposed surface under a low pressure.

It is an additional object of the invention to provide a packing element of the character described molded into a retaining groove and adapted to be secured therein by connector means extending rearwardly from said groove.

Still another object of the invention is to provide sealing means which can be economically manufactured and installed.

These and other objects and advantages of the invention will become apparent from the following detailed description of a preferred form thereof, and from an inspection of the accompanying drawings, in which:

FIGURE 1 is a cross-sectional view showing a typical installation of a fastener having my sealing means thereon;

FIGURE 2 is an enlarged sectional detail showing the underformed shape of the packing member;

FIGURE 3 is a view similar to FIGURE 2 showing the packing member deformed into sealing engagement with the adjacent wall structure;

FIGURE 4 is a bottom plan view of the fastener head showing the holding ribs formed in the retaining groove;

FIGURE 5 is a schematic detail of a mold for forming the packing member;

FIGURE 6 is a sectional view of a typical valve structure showing another form of sealing means therein;

FIGURE 7 is a cross-section taken along the line 7—7 of FIGURE 6 with the packing element partially broken away;

FIGURE 8 is an enlarged detail of the portion of FIGURE 6 encircled by the arrow 8 and showing the packing element and the adjacent structure;

FIGURE 9 is a view similar to FIGURE 8 showing the packing element in deformed shape;

FIGURE 10 is an enlarged fragmentary sectional view of that portion of the valve shown in FIGURE 6 which is encircled by the arrow 8, but showing the use of a modified form of packing element;

FIGURE 11 is a view similar to FIGURE 10 but showing the packing element in the deformed shape produced by the closing of the valve;

FIGURE 12 is a fragmentary sectional view of a poppet type valve having conical seating surfaces showing installed on the valve member a packing element substantially of the character illustrated in FIGURES 1 and 2;

FIGURE 13 is an enlarged fragmentary view of the portion of FIGURES 12 which is encircled by the arrow 13 and showing in detail the packing element;

FIGURE 14 is a view similar to FIGURE 13 but showing the packing element of FIGURES 12 and 13 in the deformed shape produced by closing of the valve;

FIGURE 15 is a view similar to FIGURE 12 but showing the packing element installed on the valve seat member; and FIGURE 16 is a enlarged fragmentary view of the portion of FIGURE 15 which is encircled by the arrow 16 and showing the packing element of FIGURE 15 in the deformed shape produced by the closing of the valve.

Referring now to the drawings, and particularly to FIGURE 1 thereof, the invention is shown in connection with a pair of overlapping plates 20 and 21 which may form a portion of a tank or other fluid-tight structure. A cylindrical opening 22 extends through the plates to permit the installation of a fastener 24 for securing the plates together. The fastener 24 may be of the threaded type having a shank adapted to threadedly engage within the inner plate, as illustrated. It is to be understood, however, that the invention is not restricted to use with a threaded fastener but may also be used with rivets, or the like.

The requirements of the installation are that the fastener be seated flush with the surface of the outer plate 20, and to this end a countersunk tapered opening 25 is formed at the edge of the plate concentric with the opening 22. Fastener 24 has a cylindrical elongated shank 26 extending through opening 22 and an enlarged head 27 formed in the shape of a truncated cone and adapted to engage against the marginal wall of opening 25. When fastener 24 is fully seated, head 27 just fills opening 25 and the top of the fastener lies flush with the outer surface of plate 20. Fastener 24 is formed of metal or other rigid material and, to the extent described, is of conventional design, including an upper driving socket 28 for tool engagement.

Extending around the exterior of head 27 on the tapered peripheral surface thereof is an annular retaining groove 30 which is of generally triangular sectional shape, as is best seen in FIGURE 2. The sides of groove 30 are preferably at right angles and join in a radiused bottom corner. Within groove 30 is a packing member or ring 31 which is formed of a resilient deformable material, preferably a synthetic rubber which is corrosion resistant and maintains its resilience over a wide temperature range. Member 31 has a bottom portion which completely fills the bottom of groove 30 and an outer portion which includes a raised central projection 32 extending outwardly beyond the peripheral surface of head 27. The face of projection 32 is preferably of rounded section and is joined to the inner or lower side of groove 30 by a solid portion 33 which lies flush with the top of the groove.

Adjacent the upper side of groove 30 is a side or spacer portion 34 which is joined integrally with the bottom portion of the packing member, but is spaced from the central projection 32. Spacer portion 34 and projection 32 define therebetween a continuous void or channel 35 which as illustrated is of angular section. In order that packing member 31 may have the proper volumetric relationship with groove 30, I follow the principles of construction set forth in my Patent No. 2,717,793, issued September 13, 1955, for Fluid Seal and Manufacture Thereof in molding the packing ring directly into the groove. Reference is made to the aforesaid patent for a complete description of the principles employed, but the nature of the molding operation can be understood from an inspection of FIGURE 5. Briefly, it is desired to produce a packing ring 31 which will have the same volume as the volume of the groove 30 regardless of dimensional variations in the groove. Thus, proper resilient deformation of the packing member is insured.

As shown, a lower die or mold 40 has a cavity 41 on the top face thereof shaped to receive fastener head 27. Cavity 41 is generally cylindrical so that the tapered face of head 27 and groove 30 are exposed for engagement with an upper mold 42 having a lower face 43 shaped to seat against the head on both sides of the groove. At the outer side of mold 42 a plurality of spaced sprue openings 44 are cut through the mold to admit the material of the packing ring in a plastic state. A slot or channel 45 extends around the entire periphery of groove 30 at the outer edge thereof and communicates with the sprue openings 44. Packing material may therefore be flowed under pressure to fill groove 30 and form member 31.

In the area opposite groove 30, mold 42 has a recessed cavity 46 complemental in shape to the raised central projection 32 and adapted to shape the latter. At the side of cavity 46 is a raised die 47 shaped complemental to channel 35 and defining the same. The side spacer portion 34 which is formed in member 31 is formed to the size and shape necessary to fill the space in groove 30 remaining after the entrance of die 47. In other words, spacer portion 34 varies in volume in accordance with dimensional variations in groove 30. It can also be seen that since mold face 43 seats against the face of head 27, die 47 always projects into groove 30 the same amount regardless of the vertical depth of the groove. Thus, variations in the depth of groove 30 do not vary the volumetric relationship between the groove 30 and member 31.

In use, member 31 has a normal undeformed shape as seen in FIGURE 2, with projection 32 adapted to contact the marginal wall of opening 25 before head 27 is seated. As head 27 moves inwardly to the position shown in FIGURE 3, projection 32 is flattened and deformed to fill channel 35. Since the deformation of member 31 is of a resilient nature, the flattened projection 32 bears against the wall of opening 25 in tight sealing engagement to prevent any fluid leakage thereacross. It should also be noted that the use of member 31 in no way interferes with the normal seating of head 27, so that the fastener may lie properly positioned in flush relationship with the surface of plate 20.

It will also be noted that as the fastener 24 moves downwardly from the position shown in FIGURE 2 to that shown in FIGURE 3, the forces acting on the projection 32 tend to deform the projection 32 toward and into the void channel 35, rather than away from and out of said channel. This prevents extrusion and pinching off of the packing element 31 between the mating faces of the opening 25 and head 27, and this result is achieved by positioning the void channel 35 on the side of the projection 32 toward which the projection 32 is deformed by the transverse component of force acting thereon.

If fastener 24 is of the threaded type, as shown, there is rotational friction exerted upon member 31 during the final seating of head 27. To prevent relative rotation between member 31 and head 27, it may be desirable to form holding lugs or ribs 50 which project outwardly from the bottom of groove 30 as seen in FIGURE 4. Ribs 50 are spaced around groove 30 and extend outwardly less than the depth of the groove. As member 31 is molded in the manner described, ribs 50 interlock with the material thereof so as to positively prevent rotation. As an alternate, the surface of groove 30 may be prepared with conventional bonding agents so that member 31 is bonded thereto when formed.

In FIGURES 6 to 9, there is shown the installation of another but similar form of packing element in a poppet valve, the form there shown being best suited for use on systems operating at relatively low pressures. In these figures, numeral 60 indicates a body or housing of a typical valve structure formed of rigid material and elongated cylindrical shape having a central chamber 61 separated end passageways 62 and 63 by opposed end walls 64. Extending through walls 64 are ports 65 adapted to communicate pasageways 62 and 63 with chamber 61. A bottom port 66 may also be extended through the side wall of body 60 and opening into chamber 61. One of the end walls 64 may be formed by a removable end plug 67 for ease of access to chamber 61.

Mounted within chamber 61 is a valve or closure member 68 which is of circular disc shape and is formed of rigid material. Member 68 is supported for longitudinal movement in the chamber by opposed shaft ends 69 and 70 which are slidably fitted into journal openings 71 formed in walls 64. One of the shaft ends 69 is extended outwardly to provide an actuating shaft for moving member 68. The opposed faces of walls 64 form seating surfaces 72 which surround the ports 65, and the closure member 68 is formed with end faces 73 adapted to engage in flat abutting relationship with the seat surfaces 72 to stop or limit the movement of the closure member. Since both body 60 and closure member 68 are formed of rigid material, the engagement of either stop face 73 with the cooperating seating surface 72 provides a positive stop which accurately and precisely determines the position of closure member 68 and prevents any further movement in that direction.

As thus far described, the typical valve structure is illustrative of a control valve wherein movement of member 68 controls the flow of fluid between ports 65 and the port 68. Shut off of either of ports 65 from the chamber 61 is accomplished by moving closure member 68 fully against the corresponding end seat surface 72 to close the end of the port. As can be understood, complete shut off of either port 65 can only be achieved by providing a seal between the end seat surface 72 and the cooperating stop face 73, with the area of sealing contact surrounding the mouth of the port. Such a sealing problem is, of course, present in all valve structures, and the solution thereof by this embodiment of my invention is not in any way restricted to the valve structure herein illustrated.

In order to seal across between the seat surfaces 72 and the stop faces 73, deformable packing means 74 are mounted on the closure member 68 for sealing engagement with body 60. Each of the stop faces 73 is formed with a retaining groove 75 therein which is endless or of annular shape. The grooves 75 lie in opposed back-to-back relationship, and extending through the member 68 are a plurality of openings 76 which are spaced about the periphery of the grooves. Preferably, the grooves 75 are of rectangular cross-section and the openings 76 are circular.

Molded into each of the grooves 75 is a deformable packing element 78 (FIGURE 8) which is preferably formed of a resilient deformable rubber-like material. Synthetic rubber is preferred because of its high compression recovery. Both of the packing elements 78 are molded simultaneously into grooves 75 in the embodiment shown and are formed integrally with connectors 79 which extend through and fill the openings 76. Since the connectors 79 are formed integrally with elements 78, the latter are held against movement relative to each other and within member 68.

The method of bonding packing elements into retaining grooves so as to provide proper volumetric relationship is fully described in my Patent No. 2,717,793 issued September 13, 1955, for Fluid Seal and Manufacture Thereof, and reference is made thereto for a complete disclosure. The shape of packing elements 78 is best seen in FIGURES 8 and 9 showing undeformed and deformed sectional views. Each element 78 has a bottom portion 80 which completely fills the bottom of groove 75 and extends approximately half the depth of the grooves. The upper portion of element 78 is divided into a raised central section 81 and side spacer portions or fillers 82 which are all joined integrally with bottom portion 80.

Raised central section 81 is of rounded semi-circular cross-section and project outwardly beyond the top of groove 75 and stop face 73. Side fillers 82 terminate flush with the top of groove 75 and are spaced from section 81 by continuous channels or voids spaces 83. The relationship is such that the volume of section 81 projecting beyond stop face 73 is equal to the total volume of both void channels 83. Thus, element 78 may be deformed totally within groove 75. The side fillers 82 are of variable width so as to maintain the proper volumetric relationship between section 81 and channels 83, as is fully described in my aforementioned patent.

A closure member 68 moves towards either of the seat surfaces 72, raised section 81 is adapted to make initial contact with the seat surface 72 and to be deformed or flattened rearwardly into groove 75. The shape of section 81 and its resilient deformable character allows it to be deformed fully within groove 75 upon relatively light pressure. As soon as stop face 73 engages against surface 72, any further movement of member 68 is positively prevented so that precise positioning thereof is obtained.

However, stop face 73 engages against surface 72 when element 78 is under considerably less than the maximum pressure which it is able to effectively seal. Further application of pressure to element 78 by fluid seeking to pass between face 73 and seat 72 may cause even a greater sealing deformation of element 78 within groove 75. Such higher pressure acts to resiliently deform section 81 in the manner of an O-ring, and the high pressure sealing principles of the latter are effective here. At the same time, it can be seen that element 78 is completely confined by rigid structure and the amount of deformation thereof is limited. This prevents deformation or extrusion of element 78 beyond the elastic limits of its material, and serves to protect the element from rapid deterioration and wear.

The poppet valves of the general type above described are used on very high pressure systems; the embodiment shown in FIGURES 10 and 11 may be used to secure improved results, particularly as regards the above-described use of the fluid pressure to increase the effectiveness of the seal.

In FIGURES 10 and 11, the parts corresponding to the parts of the structure shown in FIGURE 6 are identified with the same reference characters; numeral 84 indicates generally the modified form of packing element. The packing element 84 comprises a body portion 85, which extends across the full width of the groove 75 and extends approximately half the depth of the groove, and an upper portion which is divided into a raised portion 86 and a side spacer portion or filler 87, both of which are formed integrally with the body portion 85.

The raised central section 86 is of rounded semi-circular cross-section and projects outwardly beyond the top of the groove 75 and stop face 73. The side filler 82 terminates flush with the top of the groove 75 and is spaced from the raised section 86 by a continuous void channel 88. The relationship is such that the volume of section 86 projecting beyond the stop face 73 is equal to the volume of the void channel 88, thus element 86 may be deformed totally within the groove 75.

As in the previously described modification, the radial thickness of side filler 87 may vary to conform with variations in the width of the groove 75 and the axial thickness of the body portion 85 may vary to correspond with variations in the depth of the groove 75; the requirement is that the volume of void channel 88 be equal to the volume of that portion of the rounded projection 86 which extends beyond the stop face 73.

In high pressure applications, the packing element is placed with the void channel 88 on the side of the raised portion 86 from which the pressure is applied. That is to say, for a structure such as that shown in FIGURE 6 where the fluid supply is connected to the chamber 61, the packing element 84 will be arranged as shown in FIGURE 10 with the side filler 87 at the outer side of the groove 75 and the rounded projection 86 at the inner side of the groove 75; the direction of application of fluid pressure is indicated in both FIGURES 10 and 11 by the arrow 89.

FIGURE 11 illustrates the configuration of the deformable packing element 84 when the valve is closed. It will be seen that the rounded projection 86 has been deformed so as to substantially completely fill the void space 88, this space being reduced simply to a line of contact between the sides of the projection 86 and the sides of the side filler 87. Pressure applied, as indicated by arrow 89, tends to pass between the mating faces 72 and 73 and enter between the portions 86 and 87. This pressure tends to force the portion 86 away from the element 87 and so force it into still greater pressure engagement with the face 72, thus enhancing and improving the sealing effect. The degree of such enhancement is more or less proportional to the magnitude of the pressure applied, making the described arrangement particularly suitable for high pressure applications.

There has been described with reference to FIGURES 1 through 4 a deformable packing element characterized by having the void channel on one side of the raised portion and positioned on such side that the lateral component of force tends to move the raised portion into the void channel to avoid extrusion of the material into the space between the mating metal faces. In FIGURES 10 and 11 a somewhat similar arrangement is shown in which the orientation of the packing element is arranged to take advantage of an enhanced seal resulting from the application of a high fluid pressure. In FIGURES 12 through 16, there is shown a modified valve arrangement using a tapered valve member and tapered seat, and these figures illustrate the manner in which the valve and the sealing structure can be so arranged as to take advantage of both of the properties described with reference to the above-mentioned figures. While FIGURES 12 through 16 illustrate valve arrangements, it will be understood that the same considerations apply to static seals such as are involved in the use of fasteners of the character shown in FIGURES 1 through 4, for example.

In FIGURE 12 there is shown a poppet valve comprising a valve body member 90 which is bored, as indicated at 91, to provide a valve chamber 92; one end of the body 90 may be solid, as indicated at 93, and provided with one or more inlet ports 94 which serve to conduct fluid under pressure into the valve chamber 92. A removable valve seat member 95 may be screw threaded into the body 90, as indicated at 96, valve seat member 95 providing a discharge port 97 and a tapered or conical valve seat 98 adapted to cooperate with a similarly contoured seating surface 99 formed on a poppet valve 100, the valve 100 being suitably connected to or formed integrally with an operating shaft 101 which is slidably received within a bore 102 formed in the solid head section 93. This arrangement allows the valve to be moved from an open position, such as is shown in FIGURE 12, to the left, to a closed position bringing the seating surface 99 into engagement with the valve seat 98.

As may be seen in FIGURES 12 and 13, there extends around the conical seating surface 99 an annular retaining groove 103 which is of generally triangular sectional shape, the sides of the groove preferably being at right angles and joining in a curved or radiused bottom corner. Within the groove 103 is a deformable packing member indicated generally at 104 which, as in the previously described modifications, is formed of a resilient deformable material, such as synthetic rubber. The packing element 104 includes a bottom portion which completely fills the bottom of groove 103 and an outer portion which includes a raised central projection 105 extending outwardly beyond the seating surface 99. The face of the projection 105 is preferably a rounded section which is joined to the inner or lower side of the groove 103 by a solid portion 106 which lies flush with the seating surface 99.

Adjacent the outer or upper side of the groove 103 is a side or spacer portion 107 which is joined integrally with the bottom portion of the packing member, but is spaced from the central projection 105 to define therebetween a continuous void channel 108. As in the previously described modifications, the volume of the void channel 108 is made equal to the volume of that portion of the projecting section 105 which projects outwardly beyond the seating surface 99.

From the above, it will be seen that like the application described with reference to FIGURES 1 through 4, the movement of the valve member 100 to closed position will produce a lateral component of force tending not only to deform the projection 105, but tending also to push it to one side. Placing the void channel 108 on the side toward which the projection is thus pushed prevents extrusion and pinching off of the packing element 104 between the mating faces 98 and 99. It will also be observed from FIGURES 13 and 14 (which show the deformed shape of the packing element when the valve is in its closed position) that the direction of the application of fluid pressure, indicated by the arrow 109, is such as to enhance the seal in the manner previously described with reference to FIGURES 10 and 11.

In FIGURES 15 and 16 there is illustrated an arrangement which may be used to secure the above-described advantages when high fluid pressure is applied in the opposite direction. The parts of FIGURES 15 and 16 which correspond to those of FIGURES 12 and 13 are correspondingly numbered in the drawings. The structure illustrated thereby is identical with the structure shown in FIGURES 12 and 13, except that the high pressure is applied, as indicated by the arrows 110, through the port 97 in the valve seat member 95 and in that the deformable seal is provided by a deformable packing element 111 carried in a groove 112 formed in the seating surface 98 of the valve seat member 95. The groove 112 is of the same shape as the groove 103 previously described, and the packing element 111 is of the same shape and configuration as the packing element 104 previously described, with one exception—the relative positions of the central projection 105 and the void channel 108 are reversed to conform to the previously-stated requirement that the projection 105 be downstream from the void channel 108, and meeting the further requirement that the lateral forces developed by the closing of the valve be in such direction as to tend to move the projection 105 toward the void channel 108, rather than away from that channel. FIGURE 16 illustrates the configuration of the deformable packing member in the closed position of the valve.

From the foregoing it will be observed that I have provided a sealing structure having a retaining groove and a deformable packing element therein characterized by a raised portion and a void channel on one side of the raised portion of sufficient volume to receive the raised portion therein, and in which the relative positions of the raised portion and the void channel are such as to enhance the fluid seal and minimize extrusion of the deformable material between the mating metal surfaces of the parts being sealed. It will be observed that these advantageous results are secured by placing the void channel on the side toward which the lateral component of force tends to move the raised portion as the mating faces of the two parts are brought together, and also by placing the void channel upstream of the raised portion with reference to the direction of fluid flow. It will also be observed that the parts are readily interrelated in such manner that the above conditions can be met regardless of whether the fluid pressure is applied from one side or the other, merely by placing the packing element on the under surface of the conical member or on the outer surface of the tapered counterbore or valve seat member, as the case may be.

While I have thus described in some detail a number of specific embodiments of my invention, changes of design and construction will be apparent to those skilled in the art. Therefore, I do not wish to be restricted to the foregoing except as defined in the appended claims.

I claim:

1. A self-sealing fastener for use in a countersunk opening, which includes: an elongated cylindrical shank; a head formed integrally with the top of said shank of rigid material in the shape of a truncated cone having a seating surface adapted to engage the marginal wall of said countersunk opening upon downward movement of said fastener and formed with an annular retaining groove therein of generally triangular cross-section; and a resilient deformable packing member fitted in said groove and having a bottom portion filling the bottom of said groove, said member being formed with a raised portion projecting outwardly beyond the surface of said head, a side spacer piece lying against the top side of said groove and a channel open to said seating surface between said spacer piece and raised portion and within said groove, said raised portion being flattened into sealing contact with said marginal wall when said head is seated and deformed into said channel.

2. A self-sealing fastener for use in a countersunk opening, which includes: an elongated cylindrical shank; a head formed integrally with the top of said shank of rigid material in the shape of a truncated cone having a seating surface adapted to engage the marginal wall of said countersunk opening upon downward movement of said fastener and formed with an annular retaining groove therein of generally triangular cross-section; a plurality of holding ribs projecting outwardly from the bottom of said groove a distance less than the depth of said groove; and a resilient deformable packing member fitted in said groove and having a volume substantially equal to the volume of said groove, said member being formed with a raised portion projecting outwardly beyond the surface of said head, a side spacer piece lying against the top side of said groove and a channel open to said seating surface between said spacer piece and raised portion and within said groove, said raised portion being flattened into sealing contact with said marginal wall when said head is seated and deformed into said channel.

3. A self-sealing fastener for use in a countersunk opening, which comprises: an elongated shank; a head on the top of said shank having an annular frustro-conical seating surface adapted to engage the marginal wall of said counter-sunk opening upon downward movement of said fastener and formed with an annular groove therein having an upper side wall intersecting said seating surface at an angle not less than the angle made by a plane normal to the axis of said shank and a lower side wall convergent inwardly with said upper side wall; and a deformable packing member fitted within said groove and having an annular raised portion projecting outwardly beyond said seating surface and a portion shaped to provide a void channel upwardly adjoining said raised portion and open to said seating surface for receiving said raised portion therein upon flattening thereof by downward axial movement of said fastener.

4. A self-sealing fastener for use in a countersunk opening, which includes: an elongated shank; a head on the upper end of said shank formed of rigid material in the shape of a truncated cone having a seating surface adapted to engage the marginal wall of said countersunk opening upon downward movement of said fastener and provided with an annular groove therein having its sides inwardly convergent towards the axis of said head; and a resilient deformable packing member fitted within said groove and having a volume substantially equal to that of said groove, said member being formed with a raised portion projecting outwardly beyond the surface of said head, a side spacer piece lying against the upper side of said groove, and a channel open to said seating surface between said spacer piece and raised portion within said groove, said raised portion being flattened into sealing contact with said marginal wall when said head is seated and deformed into said channel.

5. A seal for use between vertically movable engaging rigid members adapted to seat against each other, which includes: an upwardly-facing downwardly tapered surface formed on one of said members; a downwardly-facing truncated cone formed on the other of said members and having a seating surface adapted to engage said downwardly tapered surface, the seating surface of said truncated cone being formed with an annular groove therein of generally triangular cross-section and having its sides inwardly convergent towards the axis of said members; and a resilient deformable packing member fitted within said groove and having a volume substantially equal to that of said groove, said packing member being formed with a raised portion projecting outwardly beyond the seating surface of said truncated cone, a side spacer piece lying against the upper side of said groove, and a channel open to the seating surface of said truncated cone between said spacer piece and said raised portion within said groove, said raised portion being flattened upwardly into sealing contact with said downwardly tapered surface and deformed into said channel when said cone is seated against said downwardly tapered surface.

6. A seal for use between relatively longitudinally movable rigid valve members, one of said valve members being a valve seat and the other of said valve members being a poppet valve element, which includes: a tapered surface formed on said valve seat facing said poppet valve element; a truncated cone formed on said poppet valve element and having a seating surface adapted to engage the tapered surface of said valve seat, the seating surface of said truncated cone being formed with an annular groove therein of generally triangular cross-section and having its sides inwardly convergent towards the longitudinal axis of said rigid member; and a resilient deformable packing member fitted within said groove and having a volume substantially equal to that of said groove, said packing member being formed with a raised portion projecting outwardly beyond the seating surface of said truncated cone, a side spacer piece lying against the radially outer side of said groove, and a channel open to the seating surface of said truncated cone between said spacer piece and said raised portion within said groove, said raised portion being flattened radially outwardly into sealing contact with the tapered surface of said valve seat and deformed into said channel when said truncated cone is seated against said tapered surface.

7. A seal for use between vertically movable engaging rigid members adapted to seat against each other, which includes: an upwardly-facing downwardly tapered surface formed on one of said members; a downwardly-facing truncated cone formed on the other of said members and having a seating surface adapted to engage said downwardly tapered surface, the downwardly tapered surface of said one member being formed with an annular groove therein of generally triangular cross-section and having its sides outwardly convergent away from the axis of said members; and a resilient deformable packing member fitted within said groove and having a volume substantially equal to that of said groove, said packing member being formed with a raised portion projecting outwardly beyond the tapered surface of said one member, a side spacer piece lying against the lower side of said groove, and a channel open to the tapered surface of said one member between said spacer piece and said raised portion within said groove, said raised portion being flattened downwardly into sealing contact with said seating surface and deformed into said channel when said cone is seated against said downwardly tapered surface.

8. A seal as set forth in claim 7 wherein said tapered surface is formed on a valve seat member and said truncated cone is formed on a poppet valve.

References Cited in the file of this patent

UNITED STATES PATENTS

| | | |
|---|---|---|
| 874,652 | Bailey | Dec. 24, 1907 |
| 1,969,795 | Hewitt | Aug. 14, 1934 |
| 2,253,822 | Sundback | Aug. 26, 1941 |
| 2,297,070 | Poux | Sept. 29, 1942 |
| 2,314,386 | Brend | Mar. 23, 1943 |
| 2,398,399 | Alexander | Apr. 16, 1946 |
| 2,550,357 | Jansen | Apr. 24, 1951 |
| 2,572,419 | Wyss | Oct. 23, 1951 |
| 2,646,595 | Leistensnider | July 28, 1953 |
| 2,717,793 | Nenzell | Sept. 13, 1955 |
| 2,751,806 | Dickie | June 26, 1956 |
| 2,754,545 | Hendry | July 17, 1956 |
| 2,760,400 | Mills et al. | Aug. 28, 1956 |
| 2,798,256 | Eynard | July 9, 1957 |